United States Patent
Elkayam et al.

(10) Patent No.: US 7,449,796 B2
(45) Date of Patent: Nov. 11, 2008

(54) POWER OVER ETHERNET CONTROLLER SUITABLE FOR MULTIPLE MODES

(75) Inventors: Shimon Elkayam, Milton (GB); Eli Ohana, Kfar Sava (IL); Dror Korcharz, Bat Yam (IL)

(73) Assignee: Microsemi Corp. - Analog Mixed Signal Group Ltd., Hod Hasharon (IL)

( * ) Notice: Subject to any disclaimer, the term of this patent is extended or adjusted under 35 U.S.C. 154(b) by 173 days.

(21) Appl. No.: 11/460,256

(22) Filed: Jul. 27, 2006
(Under 37 CFR 1.47)

(65) Prior Publication Data
US 2007/0021094 A1 Jan. 25, 2007

Related U.S. Application Data

(63) Continuation-in-part of application No. 11/218,607, filed on Sep. 6, 2005, and a continuation-in-part of application No. 11/036,063, filed on Jan. 18, 2005, now Pat. No. 7,299,368, and a continuation-in-part of application No. 10/761,327, filed on Jan. 22, 2004.

(60) Provisional application No. 60/704,242, filed on Aug. 1, 2005.

(51) Int. Cl.
H04B 3/54 (2006.01)
H02J 3/38 (2006.01)

(52) U.S. Cl. .............................. 307/1; 307/18; 307/23; 307/29; 307/80; 307/85

(58) Field of Classification Search .................... 307/1, 307/18, 23, 29, 43, 80, 85
See application file for complete search history.

(56) References Cited

U.S. PATENT DOCUMENTS

| | | | |
|---|---|---|---|
| 6,157,089 A * | 12/2000 | Xu | 307/9.1 |
| 6,473,608 B1 | 10/2002 | Lehr et al. | |
| 6,643,566 B1 | 11/2003 | Lehr et al. | |
| 6,665,404 B2 * | 12/2003 | Cohen | 379/413 |
| 6,879,060 B2 * | 4/2005 | Hohri | 307/64 |
| 7,061,142 B1 * | 6/2006 | Marshall | 307/106 |
| 2004/0201931 A1 | 10/2004 | Korcharz et al. | |

* cited by examiner

Primary Examiner—Michael J Sherry
Assistant Examiner—Hal I Kaplan
(74) Attorney, Agent, or Firm—Simon Kahn

(57) ABSTRACT

A power over Ethernet controller supporting a plurality of powering modes, the power over Ethernet controller comprising: a pair of power sourcing equipments; and a control circuit; the control circuit being operative to control each of the pair of power sourcing equipment units in one of a first mode and a second mode, the first mode comprising operating the pair of power sourcing equipments as a single power sourcing equipment operable to power a single powered device over communication cabling, and the second mode comprising operating each of the power sourcing equipments of the pair independently so as to each be operable to power an associated powered device over communication cabling.

22 Claims, 6 Drawing Sheets

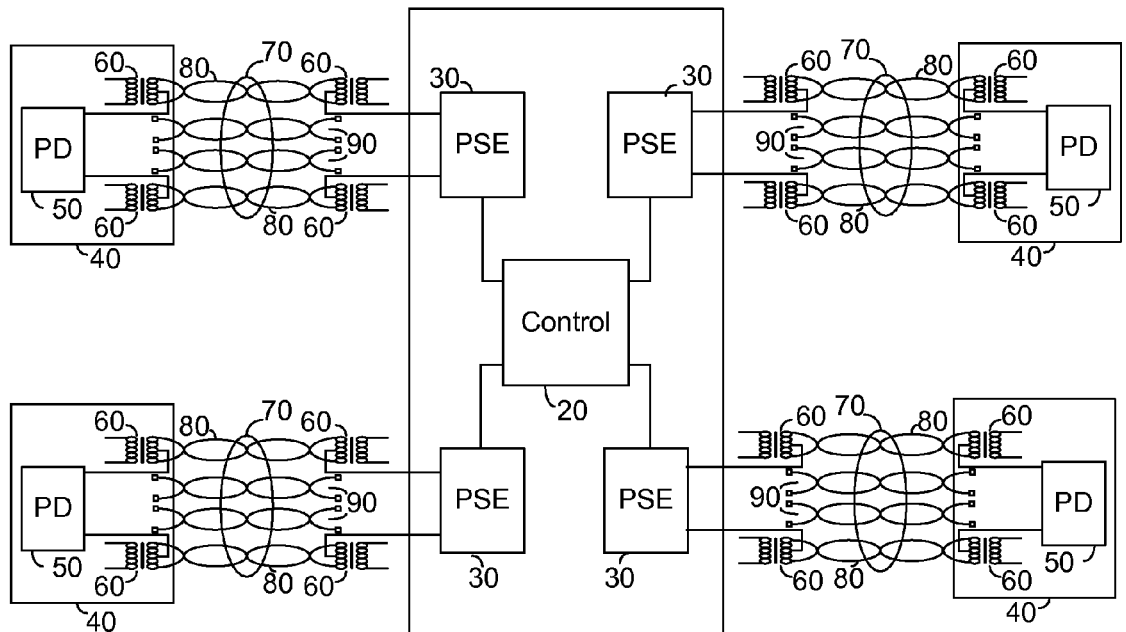
Fig. 1  *Prior Art*
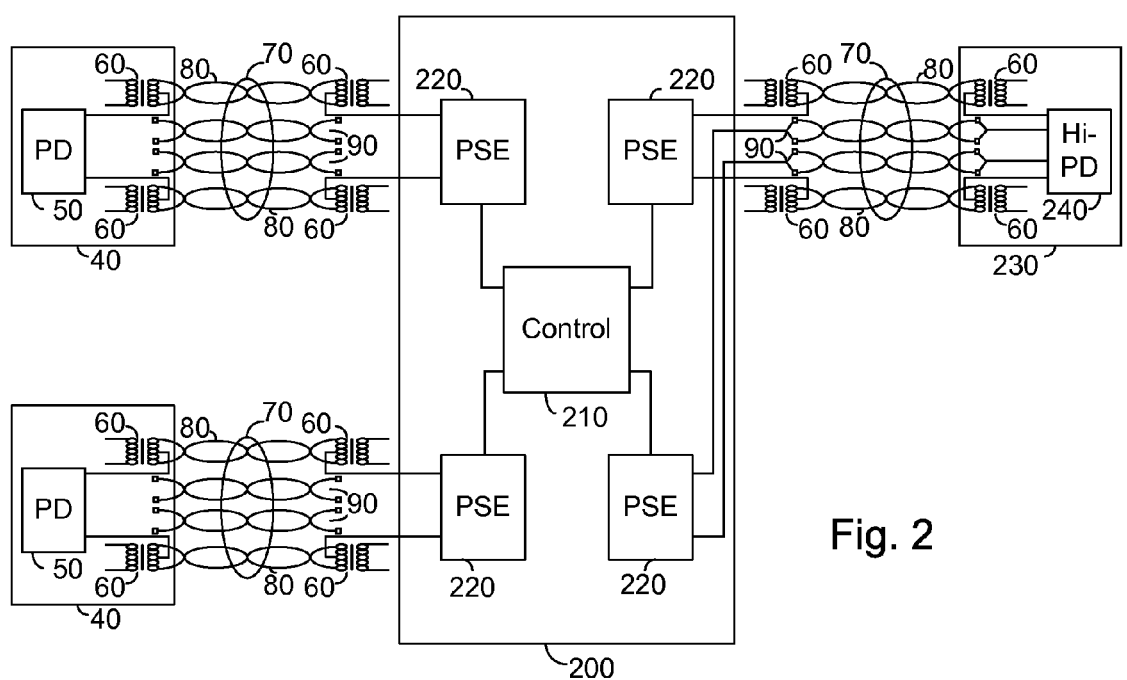
Fig. 2

POWER OVER ETHERNET CONTROLLER SUITABLE FOR MULTIPLE MODES

CROSS REFERENCE TO RELATED APPLICATIONS

This application claims priority from U.S. Provisional Patent Application Ser. No. 60/704,242 filed Aug. 1, 2005 entitled "Power Over Ethernet Controller Suitable for Multiple Modes" the entire contents of which is incorporated herein by reference. This application is a continuation in part of: U.S. patent application Ser. No. 10/761,327 filed Jan. 22, 2004 entitled "High Power Architecture for Power Over Ethernet"; U.S. patent application Ser. No. 11/036,063 filed Jan. 18, 2005 entitled "High Power Architecture for Power Over Ethernet"; and U.S. patent application Ser. No. 11/218,607 filed Sep. 6, 2005 entitled "Redundant Powered Device Circuit", the entire contents of each of which are incorporated herein by reference.

BACKGROUND OF THE INVENTION

The present invention relates to the field of remote powering and more particularly to a power over Ethernet controller supporting high power over both two twisted wire pairs and four twisted wire pairs.

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to; reduced cost of installation; centralized power and power backup; and centralized security and management.

Several patents addressed to this issue exist including: U.S. Pat. No. 6,473,608 issued to Lehr et al., and U.S. Pat. No. 6,643,566 issued to Lehr et al., the entire contents of both of which are incorporated herein by reference. Furthermore a standard addressed to the issue of powering remote devices over an Ethernet based network, known as Power over Ethernet (PoE), has been published as IEEE 802.3af-2003, whose contents are incorporated herein by reference.

The above standard is limited to a powered device (PD) having a maximum power requirement during operation of 12.95 watts. Power can be delivered to the PD either directly from the switch/hub known as an endpoint power sourcing equipment (PSE) or alternatively via a midspan PSE. Unfortunately, no provision has been made in the above standard for PDs requiring power in excess of the above maximum power requirement. The above power limitation is primarily a function of the power carrying capabilities of the installed twisted wire pairs being utilized to deliver power.

Each port in a PoE system supplies power to a connected PD, with power being transmitted from the port to the PD over two twisted wire pairs of the structured communication cabling. For each group of ports to be powered, a control circuit is typically provided to accomplish detection, optional classification, powering and monitoring in accordance with the above standard. For example, the PD64004 is a 4 channel PoE manager commercially available from PowerDsine, Ltd. of Hod Hasharon, Israel. The PD64004 implements all real time activities according to the IEEE 802.3af standard, including: detection, classification, and port status monitoring; as well as system level activities such as power management and data support for system PoE management. The PD64004 is designed to detect and disable disconnected ports, using both DC and AC disconnection methods, as defined in the aforementioned standard. The term PoE manager and PoE controller are used interchangeably throughout this document.

As described above, the current IEEE 802.3af-2003 standard is limited to a PD consuming 12.95 watts, and thus PoE controllers are designed to support these power levels. Co-pending U.S. patent application Ser. No. 10/761,327 filed Jan. 22, 2004 and published on Apr. 21, 2005 as US2005/0085212A1, the entire contents of which are incorporated herein by reference, is addressed to high power PDs requiring in excess of 12.95 watts. Power is provided over four twisted wire pairs and combined at the high power PD. Preferably power is provided simultaneously over all four twisted wire pairs. Unfortunately, commercially available PoE controllers, such as the one described above, are not designed to support such an architecture.

It has been further proposed that power in excess of the 12.95 watt limit can be supported by two twisted wire pairs of the existing communication cabling. Such an increased power will however be in excess of the design constraints of many of today's integrated PoE controllers, which exhibit integrated switches having thermal constraints.

What is therefore needed, and not known in the prior art, is a PoE controller capable of supporting powering according to the aforementioned standard, and further supporting both increased power levels over two twisted wire pairs and four twisted wire pairs.

SUMMARY OF THE INVENTION

Accordingly, it is a principal object of the present invention to overcome the disadvantages of prior art. This is provided in the present invention by a PoE controller exhibiting switches having a powering limit less than that required for increased power levels over two twisted wire pairs. The PoE controller further comprises a control circuit operable in a plurality of modes, a first of whose modes supports increased power levels over two twisted wire pairs and a second of whose modes supports power over four twisted wire pairs.

In the first mode the control circuit operates two ports as a single PSE. In an exemplary embodiment the power outputs are connected together and the real time activities including: detection, classification, and port status monitoring are activated for only one of the two ports. Thus, the two integrated switches are effectively operated in parallel enabling a doubling of the power output while real time activities are performed as a single unit. As a result, an increased power level over two twisted wire pairs is supported without increasing the power handling capabilities of a single integrated switch.

In the second mode the control circuit operates two ports as separate PSEs. Thus each port performs real time activities including detection and classification. In one embodiment each port further performs port status monitoring. Thus in the second mode PSE powering according to the low power standard associated with IEEE 802.3af-2003 is supported. Furthermore, increased power levels over four twisted wire pairs is supported, with the PD exhibiting the appropriate detection, classification and optionally a maintain power signature to each of the constituent two twisted wire pairs.

Optionally, a third mode is further supplied enabling redundant powering of a single PD. One PSE functions as a main PSE and a second PSE functions as a backup. Each port performs real time activities including detection and classification, however preferably only one port performs port status monitoring. Preferably the voltage level of the main PSE is set to a higher value than voltage level of the backup PSE. Thus, in the event of a failure of the main PSE, power is drawn from the backup PSE.

The invention provides for a power over Ethernet controller supporting a plurality of powering modes, the power over Ethernet controller comprising: a pair of power sourcing equipments; and a control circuit; the control circuit being operative to control each of the pair of power sourcing equipment units in one of a first mode and a second mode, the first mode comprising operating the pair of power sourcing equipments as a single power sourcing equipment operable to power a single powered device over communication cabling, and the second mode comprising operating each of the power sourcing equipments of the pair independently so as to each be operable to power an associated powered device over communication cabling.

In one embodiment the power over Ethernet controller further comprises a third mode in which one of the pair of power sourcing equipment is operated as a backup power sourcing equipment associated with a main power sourcing equipment. In one further embodiment the main power sourcing equipment monitors a maintain power signature associated therewith, and the backup power sourcing equipment does not monitor a maintain power signature associated with the backup power sourcing equipment. In another further embodiment the backup power sourcing equipment is set to a lower voltage level than the main power sourcing equipment.

In one embodiment, in the first mode the pair of power sourcing equipments output substantially identical currents. In another embodiment in the second mode each of the power sourcing equipments of the pair is operative to identify a connected powered device and preferably in the first mode only one of the power sourcing equipments of the pair is operative to identify the single connected device.

In one embodiment in the first mode only one of the power sourcing equipments of the pair is operative to identify the single connected device. In another embodiment in the first mode the outputs of the pair of power sourcing equipments are connected together, the connected together outputs being connected to a single power receiving input of the single powered device. In one further embodiment the connected together outputs are connected to a single receiving input of the single powered device via the communication cabling.

In one embodiment in the second mode each of the power sourcing equipments of the pair are connected to separate power inputs of a single powered device. In one further embodiment the single powered device is operative to combine the separate power inputs into a single combined power. In another further embodiment in the second mode the control circuit is operative to control the current of the pair of power sourcing equipments to be within a predetermined range of each other.

The invention independently provides for a method of operating a power over Ethernet controller comprising a plurality of power sourcing equipments in a plurality of modes, the method comprising: providing two power sourcing equipments operable in a plurality of modes; in a first mode, operating the two power sourcing equipments as a single power sourcing equipment so as to power a single powered device from the two power sourcing equipments; and in a second mode, operating each of the two power sourcing equipments independently.

In one embodiment the method further comprises: providing a third power sourcing equipment; designating the provided third power sourcing equipment as a main power sourcing equipment; and operating one of the provided two power sourcing equipments as a backup power sourcing equipment associated with the designated main power sourcing equipment. In one further embodiment the method comprises monitoring a maintain power signature associated with the designated main power sourcing equipment; and not monitoring a maintain power signature associated with the designated backup power sourcing equipment. In another further embodiment, the method further comprises setting the output voltage of the provided third power sourcing equipment to a first value; and setting the output of the power sourcing equipment designated as a backup to a second value, the second value being lower than the first value.

In one embodiment the method further comprises: in the first mode, controlling the provided two power sourcing equipments to exhibit substantially identical output currents. In another embodiment, the method further comprises in the second mode, operating each of the two power sourcing equipments to identify a connected powered device. In one further embodiment the method further comprises in the first mode, operating only one of the provided two power sourcing equipments to identify a connected powered device.

In one embodiment the method further comprises: in the first mode, operating only one of the provided two power sourcing equipments to identify a connected powered device. In another embodiment the method further comprises: in the first mode, connecting the outputs of the provided two power sourcing equipments together; and connecting the connected together outputs to a single power receiving input of the single powered device.

In one embodiment the method further comprises: in the second mode, connecting each of the provided two power equipments to separate power inputs of a single powered device. In one further embodiment the method further comprises combining the separate power inputs into a single combined power. In another further embodiment the method further comprises: in the second mode, controlling the current of the provided two power sourcing equipment to be within a predetermined range of each other.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings:

FIG. 1 is a high level block diagram of a PoE controller known to the prior art, comprising a plurality of PSEs and a control circuit, each PSE being connected via communication cabling to a PD, and each PSE supplying power to an associated PD over two twisted wire pairs of the associated communication cabling;

FIG. 2 is a high level block diagram of a PoE controller according to the principle of the current invention, comprising a plurality of PSEs and a control circuit, two PSEs being connected via communication cabling to a single PD, each of the two PSEs supplying power to the single PD over a separate path comprising two twisted wire pairs of the communication cabling;

DETAILED DESCRIPTION OF PREFERRED EMBODIMENTS

Figure 3:
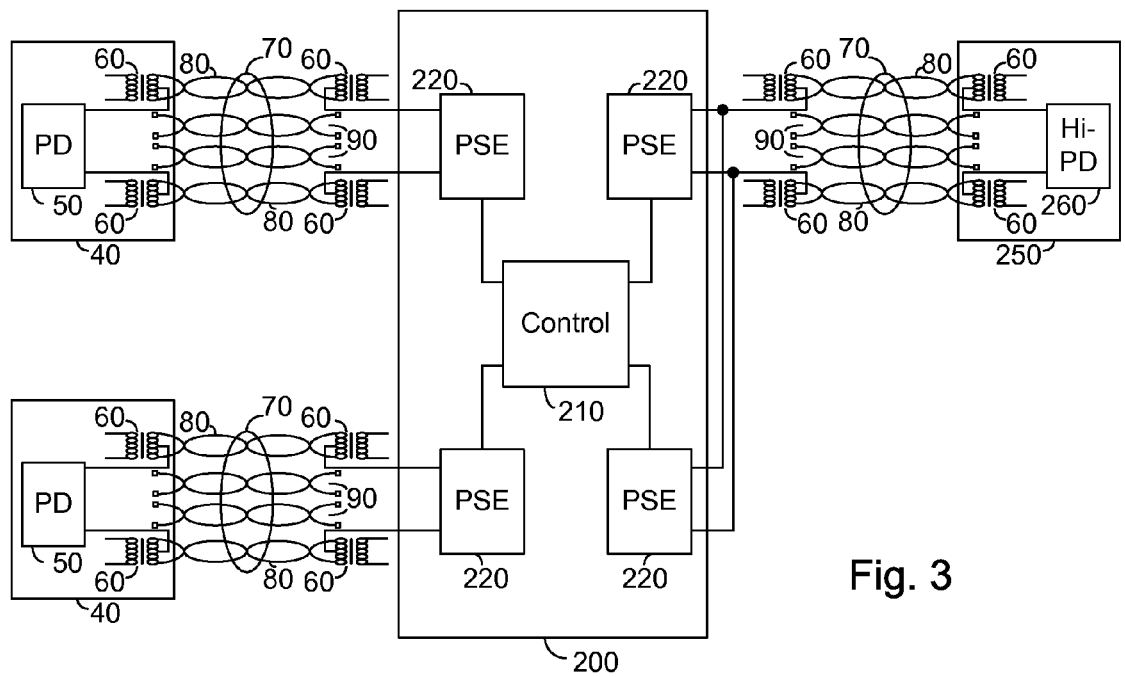
FIG. 3 is a high level block diagram of a PoE controller according to the principle of the current invention, comprising a plurality of PSEs and a control circuit, two PSEs being connected via communication cabling to a single PD, each of the PSEs supplying power to the single PD over the same path comprising two twisted wire pairs of the communication cabling.

The present embodiments enable a PoE controller exhibiting switches having a powering limit less than that required for increased power levels over two twisted wire pairs. The PoE controller further comprises a control circuit operable in a plurality of modes, a first of whose modes supports increased power levels over two twisted wire pairs and a second of whose modes supports power over four twisted wire pairs.

In the first mode the control circuit operates two ports as a single PSE. In an exemplary embodiment the power outputs are connected together and the real time activities including: detection, classification, and port status monitoring are activated for only one of the two ports. Thus, the two integrated switches are effectively operated in parallel enabling a doubling of the power output while real time activities are performed as a single unit. As a result, an increased power level over two twisted wire pairs is supported without increasing the power handling capabilities of a single integrated switch.

In the second mode the control circuit operates two ports as separate PSEs. Thus each port performs real time activities including detection and classification. In one embodiment each port further performs port status monitoring. Thus in the second mode PSE powering according to the low power standard associated with IEEE 802.3af-2003 is supported. Furthermore, increased power levels over four twisted wire pairs is supported, with the PD exhibiting the appropriate detection, classification and optionally a maintain power signature to each of the constituent two twisted wire pairs.

Optionally, a third mode is further supplied enabling redundant powering of a single PD. One PSE functions as a main PSE and a second PSE functions as a backup. Each port performs real time activities including detection and classification, however preferably only one port performs port status monitoring. Preferably the voltage level of the main PSE is set to a higher value than voltage level of the backup PSE. Thus, in the event of a failure of the main PSE, power is drawn from the backup PSE.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level block diagram of a PoE controller known to the prior art, comprising a plurality of PSEs and a control circuit, each PSE being connected via a communication cabling to a PD, and each PSE supplying power to an associated PD over two twisted wire pairs of the communication cabling. The system of FIG. 1 comprises: a PoE controller 10 comprising a control circuit 20 and a plurality of PSEs 30; a plurality of powered end stations 40 each comprising a PD 50 and a first and second data transformer 60, each of the plurality of powered end stations 40 being associated with a unique one PSE 30; a plurality of communication cablings 70 each comprising a plurality of twisted wire pairs, specifically two twisted wire data pairs 80 and 2 spare twisted wire pairs 90, each of the plurality of communication cabling 70 being associated with a unique one PSE 30 and its associated powered end station 40; and a third and fourth data transformer 60 associated with each respective twisted wire data pair 80.

Control circuit 20 is connected to each of the plurality of PSEs 30. The two outputs of each PSE 30, representing power and return, are respectively connected to a center tap of the secondary of each of the respective associated third and fourth data transformers 60. The ends of the secondary of each of the respective associated third and fourth data transformers 60 are respectively connected to a first end of one of the two twisted wire data pairs 80 of the associated communication cabling 70. The second end of each of the two twisted wire data pairs 80 are respectively connected to ends of the primary of first and second data transformers 60 of the associated powered end station 40. The center tap of the primary of each of first and second data transformers 60 are connected to the power inputs of PD 50, representing power and return. Spare twisted pairs 90 are not used, and in an exemplary embodiment are terminated in a manner known to those skilled in the art.

In operation control circuit 20 operates each PSE 30 to identify, optionally classify, power and monitor the associated PD 50 via the associated communication cabling 70. Each PD 50 is shown as being powered via the twisted wire data pairs 80, however this is not meant to be limiting in any way. In an exemplary embodiment one end of each of the two spare twisted wire pairs 90 are connected via a diode bridge to PD 50 so as to enable powering via either two twisted wire data pairs 80 or two spare twisted wire pairs 90. In one embodiment, such as a gigabit Ethernet environment, all four twisted wire pairs are utilized for data, and thus spare twisted wire pairs 90 carry data as well.

Control circuit 20 is shown as being a separate module from each PSE 30 and in communication with each PSE 30, however this is not meant to be limiting in any way. In one embodiment certain functions, such as detection, classification and monitoring of each PSE 30 are accomplished via control circuit 20 in cooperation with each PSE 30. PSE 30, at a minimum, comprises a controllable switch such as a FET, power MOSFET or bipolar transistor. Preferably a power MOSFET is used so as to enable current limiting.

FIG. 2 is a high level block diagram of a PoE controller according to the principle of the current invention, comprising a plurality of PSEs and a control circuit, two PSEs being connected via communication cabling to a single PD, each of the two PSEs supplying power to the single PD over a separate path comprising two twisted wire pairs of the communication cabling. The system of FIG. 2 comprises: a PoE controller 200 comprising a control circuit 210 and a first, second, third and fourth PSE 220; a plurality of powered end stations 40 each comprising a PD 50 and a first and second data transformer 60, each of the plurality of powered end stations 40 being associated with a unique one PSE 220; a powered end station 230 comprising a high powered PD 240 and a first and second data transformer 60; a plurality of communication cablings 70 each comprising a plurality of twisted wire pairs, specifically two twisted wire data pairs 80 and two spare twisted wire pairs 90, each of the plurality of communication cablings 70 being associated with a unique one powered end station 40 or powered end station 230; and a third and fourth data transformer 60 associated with each respective twisted wire data pair 80.

Control circuit 210 is connected to each of first through fourth PSEs 220. The two outputs of first PSE 220, representing power and return, are respectively connected to a center tap of the secondary of each of the respective third and fourth data transformers 60 associated with twisted wire data pairs 80 and respective powered end station 230. The two outputs of second PSE 220, representing power and return, are respectively connected to first ends of each of two spare twisted wire pairs 90 of communication cabling 70 associated with powered end station 230. The ends of the secondary of each of the respective associated third and fourth data transformers 60 are respectively connected to a first end of one of the two twisted wire data pairs 80 of communication cabling 70 associated with power end station 230. The second end of each of the two twisted wire data pairs 80 are respectively connected to ends of the primary of first and second data transformers 60 of the associated powered end station 230. The center tap of the primary of each of first and second data transformers 60 of powered end station 230 are connected to a first power input of high power PD 240, representing power and return. The second end of each of the two spare twisted wire pairs 90 are respectively connected to a second power input of high power PD 240, representing power and return. The first power input of high power PD 240 is thus operatively connected to receive power from first PSE 220 via two twisted wire data pairs 80 of data communication cabling 70 and the second power input of high power PD 240 is thus operatively connected to receive power from second PSE 220 via two spare twisted wire pairs 90 of data communication cabling 70.

High power PD 240 is arranged to draw power in excess of 12.95 watts by drawing power from first and second power inputs of high power PD 240 and combining the power, preferably as described in pending U.S. patent application Ser. No. 10/761,327 filed Jan. 22, 2004 entitled "High Power Architecture for Power Over Ethernet" the entire contents of which is incorporated herein by reference.

The two outputs of each of third and fourth PSE 220, respectively representing power and return, are respectively connected to a center tap of the secondary of each of the respective third and fourth data transformers 60 associated with twisted wire data pairs 80 of communication cabling 70 and respective powered end station 40. The ends of the secondary of each of the respective associated third and fourth data transformers 60 are respectively connected to a first end of one of the two twisted wire data pairs 80 of the associated communication cabling 70. The second end of each of the two twisted wire data pairs 80 are respectively connected to ends of the primary of first and second data transformers 60 of the associated powered end station 40. The center tap of the primary of each of first and second data transformers 60 are connected to the power inputs of PD 50, representing power and return. Spare twisted pairs 90 of data communication cabling 70 associated with powered end station 40 are not used, and in an exemplary embodiment are terminated in a manner known to those skilled in the art.

In operation control circuit 210 operates first and second PSE 220 to identify, optionally classify, power and monitor the associated power input of high power PD 240 via the associated communication cabling 70. Power is supplied via two separate channels, a first channel comprising twisted wire data pairs 80 and a second channel comprising spare twisted wire pairs 90. Each communication cabling 70 is shown comprising twisted wire data pairs 80 and spare wire pairs 90 however this is not meant to be limiting in any way. In one embodiment, such as a gigabit Ethernet environment, all four twisted wire pairs are utilized for data, and thus spare twisted wire pairs 90 carry data as well. In such an embodiment first PSE 220 powers high power PD 240 via a first set of two twisted wire data pairs of communication cabling 70, and second PSE 220 powers high power PD 240 via a distinct second set of two twisted wire data pairs of communication cabling 70.

Control circuit 210 further operates third and fourth PSE 220 to identify, optionally classify, power and monitor the associated PD 50 via the associated communication cabling 70. Each PD 50 is shown as being powered via the twisted wire data pairs 80, however this is not meant to be limiting in any way. In an exemplary embodiment one end of each of the two spare twisted wire pairs 90 are connected via a diode bridge to PD 50 so as to enable powering via either two twisted wire data pairs 80 or two spare twisted wire pairs 90. In one embodiment, such as a gigabit Ethernet environment, all four twisted wire pairs are utilized for data, and thus spare twisted wire pairs 90 carry data as well.

Control circuit 210 is shown as being a separate module from each PSE 220 and in communication with each PSE 220, however this is not meant to be limiting in any way. In one embodiment certain functions, such as detection, classification and monitoring of each PSE 220 are accomplished via control circuit 210 in cooperation with each PSE 220. PSE 220, at a minimum, comprises a controllable switch such as a FET, power MOSFET or bipolar transistor. Preferably a power MOSFET is used so as to enable current limiting.

FIG. 3 is a high level block diagram of a PoE controller according to the principle of the current invention, comprising a plurality of PSEs and a control circuit, two PSEs being connected via communication cabling to a single PD, each of the PSEs supplying power to the single PD over the same path comprising two twisted wire pairs of the communication cabling. The system of FIG. 3 comprises: a PoE controller 200 comprising a control circuit 210 and a first, second, third and fourth PSE 220; a plurality of powered end stations 40 each comprising a PD 50 and a first and second data transformer 60, each of the plurality of powered end stations 40 being associated with a unique one PSE 220; a powered end station 250 comprising a high powered PD 260 and a first and second data transformer 60; a plurality of communication cablings 70 each comprising a plurality of twisted wire pairs, specifically two twisted wire data pairs 80 and two spare twisted wire pairs 90, each of the plurality of communication cabling 70 being associated with a unique one powered end station 40 or powered end station 250; and a third and fourth data transformer 60 associated with each respective twisted wire data pair 80.

Control circuit 210 is connected to each of first through fourth PSEs 220. The two outputs of first PSE 220, representing power and return, are respectively connected to a center tap of the secondary of each of the respective third and fourth data transformers 60 associated with twisted wire data pairs 80 of communication cabling 70 and respective powered end station 250. The two outputs of second PSE 220, representing power and return, are respectively connected to the center tap of the secondary of each of the respective third and fourth data transformers 60 associated with twisted wire data pairs 80 of communication cabling 70 and respective powered end station 250. Thus, first and second PSE 220 are connected in parallel. The ends of the secondary of each of the respective associated third and fourth data transformers 60, associated with powered end station 250, are respectively connected to a first end of one of the two twisted wire data pairs 80 of the associated communication cabling 70. The second end of each of the two twisted wire data pairs 80 are respectively connected to ends of the primary of first and second data transformers 60 of the associated powered end station 250. The center tap of the primary of each of first and second data transformers 60 of powered end station 250 are connected to the power input of high power PD 260, representing power and return. Spare twisted pairs 90 of data communication cabling associated with powered end station 250 are not used, and in an exemplary embodiment are terminated in a manner known to those skilled in the art.

High power PD 260 is arranged to draw power in excess of 12.95 watts via a single set of two twisted wire pairs, the increase in power in one embodiment being enabled by increasing the voltage supplied from the associated PSE 220.

The two outputs of each of third and fourth PSE 220, representing power and return, are respectively connected to a center tap of the secondary of each of the respective third and fourth data transformers 60 associated with twisted wire data pairs 80 of communication cabling 70 and respective powered end station 40. The ends of the secondary of each of the respective associated third and fourth data transformers 60 are respectively connected to a first end of one of the two twisted wire data pairs 80 of the associated communication cabling 70. The second end of each of the two twisted wire data pairs 80 are respectively connected to ends of the primary of first and second data transformers 60 of the associated powered end station 40. The center tap of the primary of each of first and second data transformers 60 are connected to the power inputs of PD 50, representing power and return. Spare twisted pairs 90 of data communication cabling 70 associated with powered end station 40 are not used, and in an exemplary embodiment are terminated in a manner known to those skilled in the art.

In operation control circuit 210 operates only one of first and second PSE 220 to identify, optionally classify, and monitor the associated power input of high power PD 260 via the associated communication cabling 70. Control circuit 210 operates both first and second PSE 220 to supply power over a single channel comprising twisted wire data pairs 80 of communication cabling 70. Power is shown supplied over data communication twisted pairs 80 however this is not meant to be limiting in any way. In an exemplary embodiment one end of each of the two spare twisted wire pairs 90 are connected via a diode bridge to high power PD 260 so as to enable powering via either two twisted wire data pairs 80 or two spare twisted wire pairs 90. In one embodiment, such as a gigabit Ethernet environment, all four twisted wire pairs are utilized for data, and thus spare twisted wire pairs 90 carry data as well.

Control circuit 210 further operates third and fourth PSE 220 to identify, optionally classify, power and monitor the associated PD 50 via the associated communication cabling 70.

Control circuit 210 is shown as being a separate module from each PSE 220 and in communication with each PSE 220, however this is not meant to be limiting in any way. In one embodiment certain functions, such as detection, classification and monitoring of each PSE 220 are accomplished via control circuit 210 in cooperation with PSE 220. PSE 220, at a minimum, comprises a controllable switch such as a FET, power MOSFET or bipolar transistor. Preferably a power MOSFET is used so as to enable current limiting.

Figure 4:
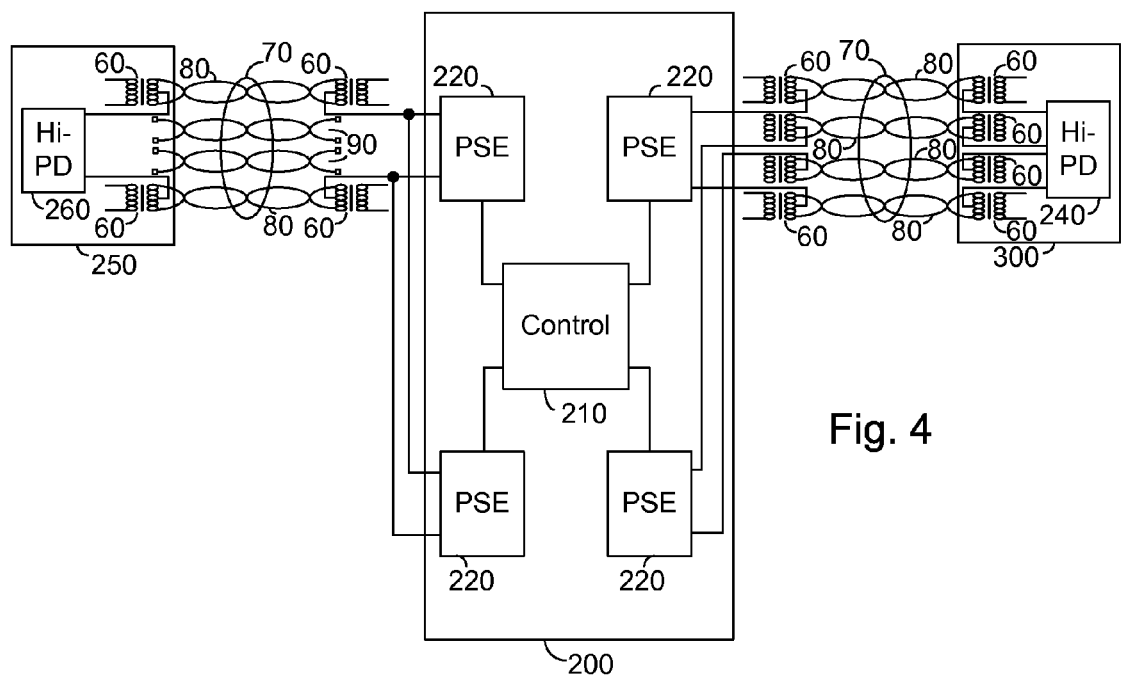
FIG. 4 is a high level block diagram of a PoE controller according to the principle of the current invention, comprising a plurality of PSEs and a control circuit, a first plurality of PSEs being connected via communication cabling to a first high power PD, each of the first plurality of PSEs supplying power to the first high power PD over a separate path comprising two twisted wire pairs of the communication cabling, and a second plurality of PSEs being connected via communication cabling to a second high power PD, each of the second plurality of PSEs supplying power to the second high power PD over the same path comprising two twisted wire pairs of the communication cabling.

FIG. 4 is a high level block diagram of a PoE controller according to the principle of the current invention, comprising a plurality of PSEs and a control circuit, a first plurality of PSEs being connected via communication cabling to a first high power PD, each of the first plurality of PSEs supplying power to the first high power PD over a separate path comprising two twisted wire pairs of the communication cabling, and a second plurality of PSEs being connected via communication cabling to a second high power PD, each of the second plurality of PSEs supplying power to the second high power PD over the same path comprising two twisted wire pairs of the communication cabling. The system of FIG. 4 comprises: a PoE controller 200 comprising a control circuit 210 and a first, second, third and fourth PSE 220; a powered end station 300 comprising a high powered PD 240 and a first, second, third and fourth data transformer 60; a first communication cabling 70 comprising a plurality of twisted wire pairs, specifically four twisted wire data pairs 80; a fifth, sixth, seventh and eight data transformer 60 associated with first communication cabling 70, each of fifth, sixth, seventh and eight data transformers 60 being associated with a respective one of the four twisted wire data pairs 80; a powered end station 250 comprising a high powered PD 260 and a ninth and tenth data transformer 60; a second communication cabling 70 associated with powered end station 250 comprising a plurality of twisted wire pairs, specifically two twisted wire data pairs 80 and 2 spare twisted wire pairs 90; and an eleventh and twelfth data transformer 60 associated with respective twisted wire data pairs 80 of second communication cabling 70.

High power PD 240 is arranged to draw power in excess of 12.95 watts by drawing power from first and second power inputs of high power PD 240 and combining the power, preferably as described in pending U.S. patent application Ser. No. 10/761,327 filed Jan. 22, 2004 entitled "High Power Architecture for Power Over Ethernet". High power PD 260 is arranged to draw power in excess of 12.95 watts via a single set of two twisted wire pairs, the increase in power in one embodiment being enabled by increasing the voltage supplied from the associated PSE 220.

Control circuit 210 is connected to each of first through fourth PSEs 220. The two outputs of first PSE 220, representing power and return, are respectively connected to a center tap of the secondary of each of the respective fifth and sixth data transformers 60. The two outputs of second PSE 220, representing power and return, are respectively connected to a center tap of the secondary of each of the respective seventh and eighth data transformers 60. The ends of the secondary of each of the respective associated fifth, sixth, seventh and eighth data transformers 60 are respectively connected to a first end of one of the twisted wire data pairs 80 of first communication cabling 70. The second end of the twisted wire data pair 80 of first communication cabling 70 whose first end is connected to fifth data transformer 60 is connected to the primary of first data transformer 60 of powered end station 300. The second end of the twisted wire data pair 80 of first communication cabling 70 whose first end is connected to sixth data transformer 60 is connected to the primary of second data transformer 60 of powered end station 300. The second end of the twisted wire data pair 80 of first communication cabling 70 whose first end is connected to seventh data transformer 60 is connected to the primary of third data transformer 60 of powered end station 300. The second end of the twisted wire data pair 80 of first communication cabling 70 whose first end is connected to eight data transformer 60 is connected to the primary of fourth data transformer 60 of powered end station 300. The center tap of the primary of each of first and second data transformers 60 of powered end station 300 are connected to a first power input of high power PD 240, respectively representing power and return of a first channel. The center tap of the primary of each of third and fourth data transformers 60 of powered end station 300 are connected to a second power input of high power PD 240, respectively representing power and return of a second channel. The first power input of high power PD 240 is thus operatively connected to receive power from first PSE 220 via the first channel comprising a first set of two twisted wire data pairs 80 of first data communication cabling 70 and the second power input of high power PD 240 is thus operatively connected to receive power from second PSE 220 via the second channel comprising a distinct separate second set of two twisted wire data pairs 80 of first data communication cabling 70.

The two outputs of third PSE 220, respectively representing power and return, are respectively connected to a center tap of the secondary of each of the respective eleventh and twelfth data transformers 60 associated with twisted wire data pairs 80 of second communication cabling 70. The two outputs of fourth PSE 220, representing power and return, are respectively connected to the center tap of the secondary of each of the respective eleventh and twelfth data transformers 60 associated with twisted wire data pairs 80 of second communication cabling 70. Thus, third and fourth PSE 220 are connected in parallel. The ends of the secondary of each of the respective associated eleventh and twelfth data transformers 60 are respectively connected to a first end of each of one of the two twisted wire data pairs 80 of the associated communication cabling 70. The second end of each of the two twisted wire data pairs 80 are respectively connected to ends of the primary of ninth and tenth data transformers 60 of the associated powered end station 250. The center tap of the primary of each of ninth and tenth data transformers 60 of powered end station 250 are connected to the power input of high power PD 260, representing power and return. Spare twisted pairs 90 of second data communication cabling 70 associated with powered end station 250 are not used, and in an exemplary embodiment are terminated in a manner known to those skilled in the art.

In operation control circuit 210 operates first and second PSE 220 to identify, optionally classify, power and monitor the associated power input of high power PD 240 via the associated first communication cabling 70. Power is supplied via two separate channels, a first channel comprising a first set of twisted wire data pairs 80 and a second channel comprising a second set of twisted wire data pairs 80 of first communication cabling 70.

Control circuit 210 further operates only one of third and fourth PSE 220 to identify, optionally classify, and monitor the associated power input of high power PD 260 via the associated second communication cabling 70. Control circuit 210 operates both third and fourth PSE 220 to supply power over a single channel comprising twisted wire data pairs 80 of second communication cabling 70. Power is shown supplied over data communication twisted pairs 80 however this is not meant to be limiting in any way. In an exemplary embodiment one end of each of the two spare twisted wire pairs 90 are connected via diode bridge so as to enable powering via either two twisted wire data pairs 80 or two spare twisted wire pairs 90. In one embodiment, such as a gigabit Ethernet environment, all four twisted wire pairs are utilized for data, and thus spare twisted wire pairs 90 carry data as well.

Control circuit 210 is shown as being a separate module from each PSE 220 and in communication with each PSE 220, however this is not meant to be limiting in any way. In one embodiment certain functions, such as detection, classification and monitoring of each PSE 220 are accomplished via control circuit 210 in cooperation with PSE 220. PSE 220, at a minimum, comprises a controllable switch such as a FET, power MOSFET or bipolar transistor. Preferably a power MOSFET is used so as to enable current limiting.

Figure 5:
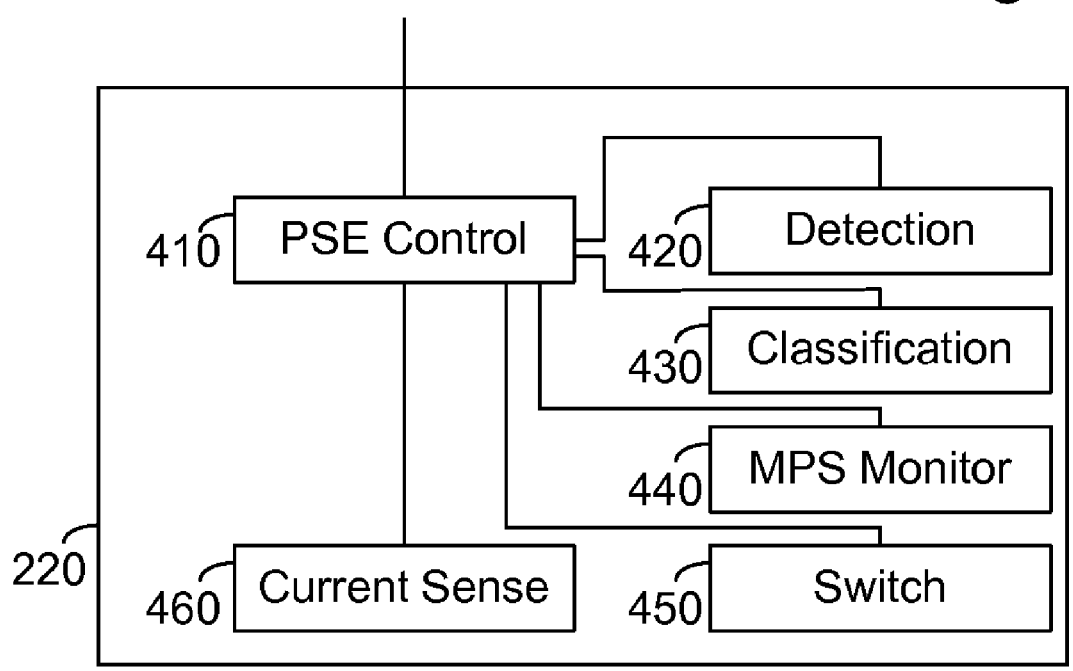
FIG. 5 is a high level block functional block diagram of each PSE in according with the principle of the current invention.

FIG. 5 is a high level block functional block diagram of each PSE 220 in according with the principle of the current invention. PSE 220 comprises a PSE control functionality 410, a detection functionality 420, a classification functionality 430, a maintain power signature monitoring functionality 440, a switch functionality 450 and a current sense functionality 460. PSE control functionality 410 is associated with control circuitry 210 and each of detection functionality 420, classification functionality 430, maintain power signature monitoring functionality 440, switch functionality 450 and current sense functionality 460.

In operation detection functionality 420 is operative under control of PSE control functionality 410 to detect a device to be powered, in an exemplary embodiment by using a plurality of voltage levels. Classification functionality 430 is operative under control of PSE control functionality 410 to classify a powered device identified by detection functionality 420 as to maximum power requirements. In an exemplary embodiment classification functionality 430 is operative in cooperation with a current source. Maintain power signature monitoring functionality 440 is operative under control of PSE control functionality 410 to monitor at least one of an AC component and a DC component of a maintain power signature (MPS). In the absence of a valid MPS, prior art devices are obligated to cease powering. In an exemplary embodiment MPS monitoring functionality 440 is operative in association with an AC signal source. Switch functionality 450 is operative under control of PSE control functionality 410 to enable power for a powered device after detection. In an exemplary embodiment switch functionality 450 comprises one of a FET, power MOSFET and a bipolar switch. Preferably a power MOSFET is used to enable linear operation thereby controlling current.

Current sense functionality 460 is operative to sense the amount of current flowing through switch functionality 450 to the detected powered device. In an exemplary embodiment current sense functionality 460 is accomplished via a sense resistor external to PoE controller 200, the current flowing via the sense resistor generating a voltage sensed and measured by current sense functionality 460. The measured voltage is available as an input to PSE control functionality 410.

It is to be understood that the functions described above in relation to each PSE 220 need not be dedicated to an individual PSE 220. In particular, some functions may be shared among a plurality of PSEs 220 and associated with control circuit 210, the functions being associated with each PSE 220 only as required.

Advantageously, control 210 of PoE controller 200 is operative to control and/or enable each functionality of PSE 220 individually. Thus, as described above in relation to FIGS. 3 and 4, and as will be described further hereinto below only certain PSEs 220 may be enabled to perform detection.

Figure 6:
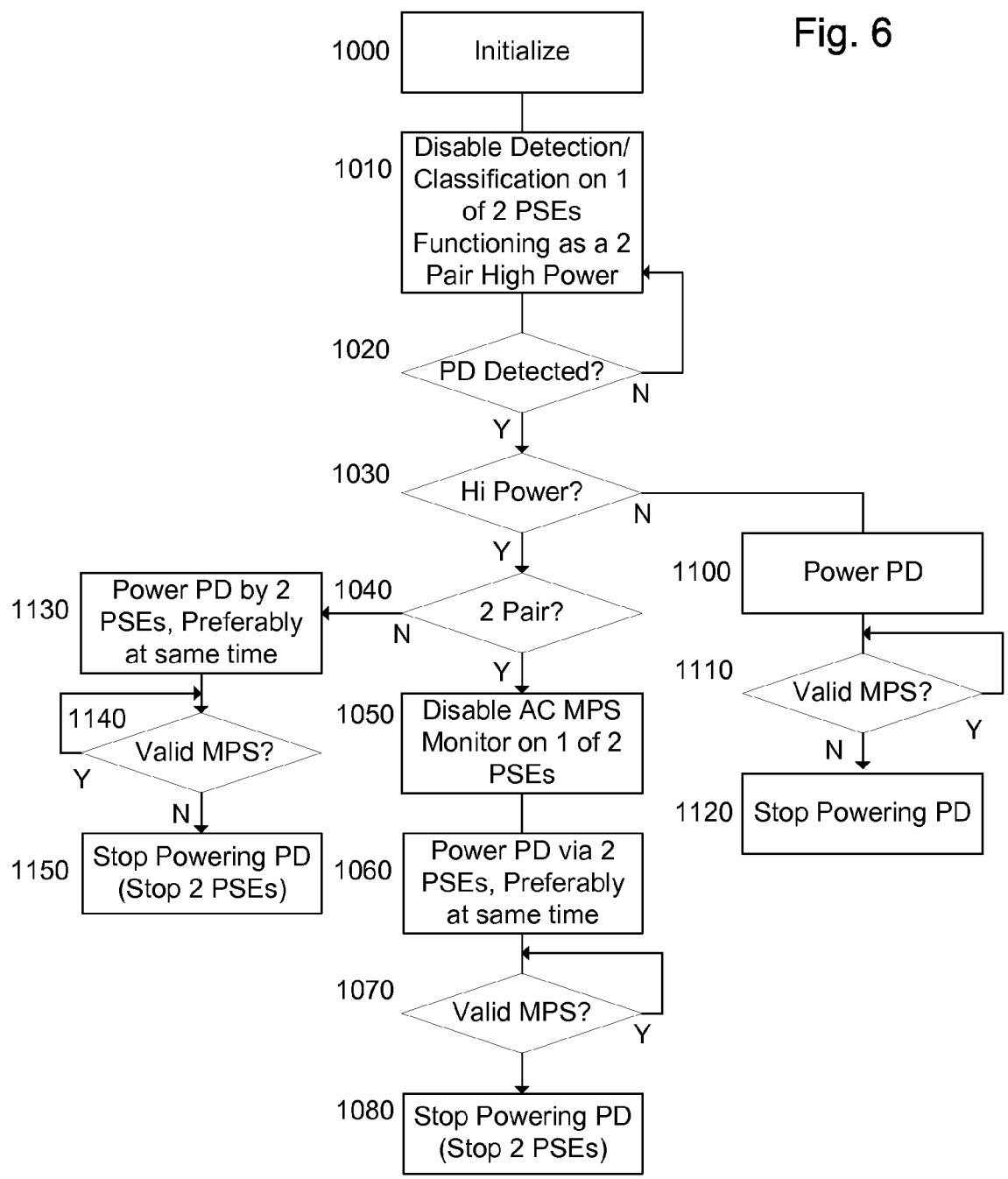
FIG. 6 is a high level flow chart of the operation of the control circuit of any of FIGS. 2-5 to power a high power PD in accordance with the principle of the current invention.

FIG. 6 is a high level flow chart of the operation of the control circuit 210 of any of FIGS. 2-5 to detect and power a PD 50, high powered PD 240 or high powered PD 260 in accordance with the principle of the current invention. In stage 1000 the system is initialized, including inputting from a host computer (not shown), or from another source, information indicating for each PSE 220 the mode of operation. Preferably, for each high power mode of operation, the pairs of PSE 220 functioning to power a high power PD 240 over separate channels are identified, and further preferably any two PSEs 220 functioning to power a single high power PD 260 over a single channel comprising two twisted wire pairs are identified. A first one of the two PSEs 220 which are to function to power a high power PD 260 over a single channel is designated as a primary, and a second one of the two PSEs 220 is designated as a secondary In stage 1010, detection functionality 420 and classification functionality 430 of the PSE 220 designated as the secondary are disabled. Thus for each pair of PSEs 220 which are to be connected together as described above in relation to high power PD 260 of FIGS. 3 and 4, also known as two pair high power, only a single detection functionality 420 and classification functionality 430 is active being associated with a primary PSE 220. In an exemplary embodiment the pairs are identified in stage 1000, however this is not meant to be limiting in any way. Other means of identification of the pairs, including self detection via test voltages, are included without exceeding the scope of the invention.

In stage 1020 detection functionality 420 of the primary PSE 220 is operated to detect an associated PD. In the event that in stage 1020 a PD is not detected stage 1010 is repeated after exchanging the designation of primary and secondary PSE 220. In the event that in stage 1020 a PD is detected, in stage 1030 the mode of operation input in stage 1000 is checked to see if PSE 220 is part of high power operation. In the event that in stage 1030 it is determined that PSE 220 is associated with high power operation, in stage 1040 the mode of operation input in stage 1000 is further checked to see if PSE 220 is associated with high power two twisted wire pair operation as described above in relation to high powered PD 260 of FIGS. 3 and 4.

In the event that in stage 1040 PSE 220 is determined to be part of a two pair high power operation, in stage 1050 AC MPS monitoring functionality of one of two PSEs 220 are disabled. In an exemplary embodiment the AC source connected with the MPS monitoring functionality is further disabled. In stage 1060, two PSEs 220 associated with powering a two pair high power PD are enabled in parallel and preferably simultaneously via switch functionality 450. Such a simultaneous operation is preferred to avoid overload by a high power PD load. In stage 1070 MPS monitoring functionality 440 is monitored. In the event that an AC MPS is monitored, only one PSE 220 monitors MPS as described above in relation to stage 1050. In the event that a DC MPS is monitored, preferably current sense functionality 460 of each PSE 220 is monitored to ensure a balanced operation. The sum of the currents sensed by current sense functionality 460 of the two PSEs 200 is used to define a valid MPS. In one embodiment the two PSEs 220 are monitored to control the current of the two PSEs 220 to be within a predetermined range. In another embodiment the two PSEs 220 are monitored to control the current of the two PSEs 220 to be substantially identical.

In the event that in stage 1070 a valid MPS is detected, stage 1070 is repeated. In the event that a valid MPS is not detected, in stage 1080 powering of both PSEs 220 is disabled.

In the event that in stage 1040 PSE 220 is determined not to be part of a two pair high power operation, thus a four pair high power PD is being powered as described in relation to high power PD 240 of FIGS. 2 and 4, in stage 1130, two PSEs 220 associated with powering a four pair high power PD are enabled in parallel and preferably simultaneously via respective switch functionality 450. Such a simultaneous operation is preferred to avoid latch up by an underpowered high power PD load. In stage 1140 MPS monitoring functionality 440 is monitored for each of the two PSEs 220 of stage 1130. In the event that in stage 1140 a valid MPS is detected, stage 1140 is repeated. In the event that in stage 1140 a valid MPS is not detected, in stage 1150 powering of both PSEs 220 is disabled.

In the event that in stage 1030 it is determined that PSE 220 is not associated with high power operation, in stage 1100 PSE 220 is enabled via switch functionality 450 to power the associated PD 50. In stage 1110 MPS monitoring functionality 440 associated with PSE 220 of stage 1100 is monitored. In the event that in stage 1110 a valid MPS is detected, stage 1110 is repeated. In the event that in stage 1110 a valid MPS is not detected, in stage 1120 powering of PD 50 is disabled by operation of switch functionality 450.

Figure 7:
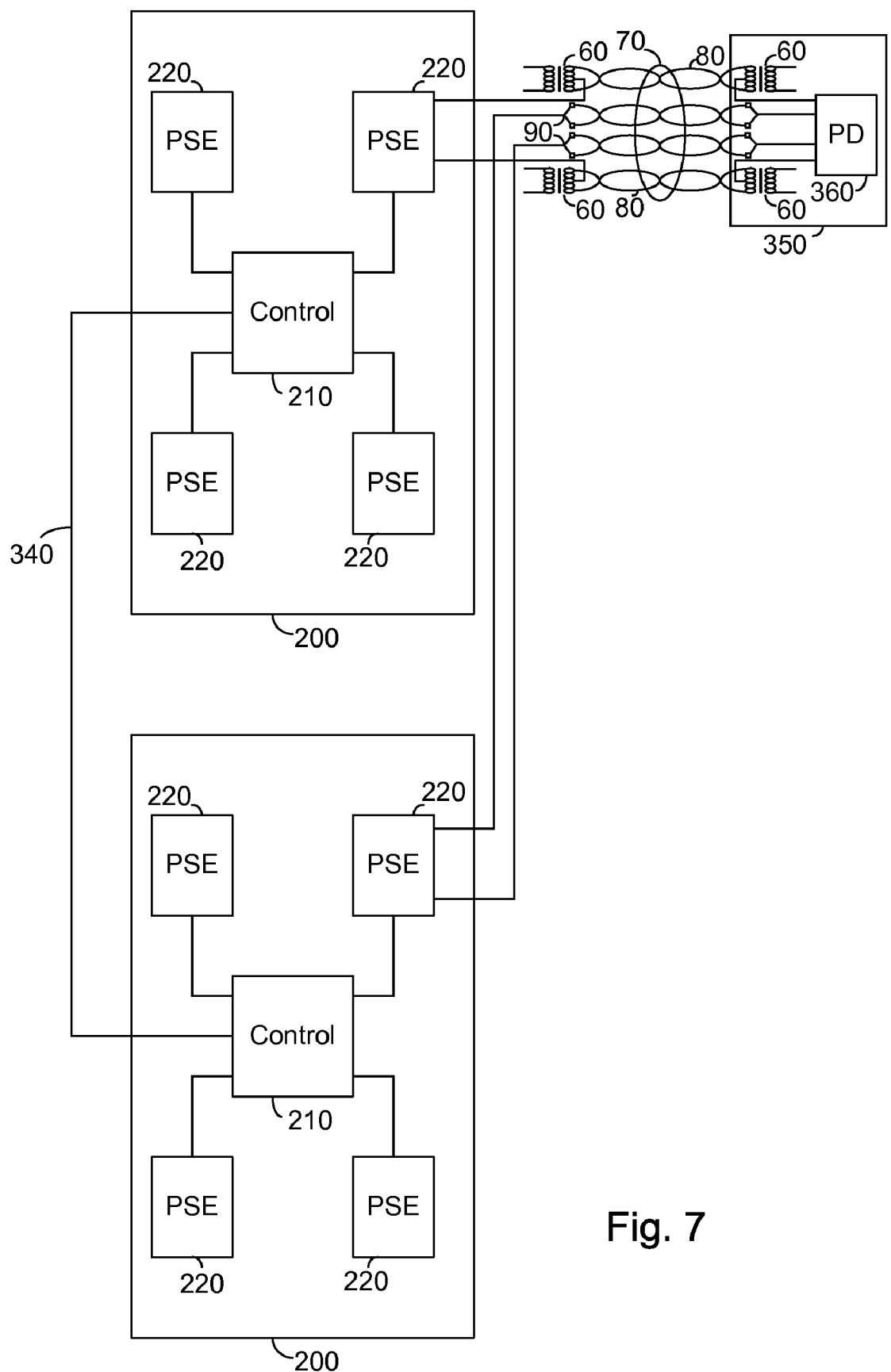
FIG. 7 is a high level block diagram of a plurality of PoE controllers providing redundant powering in accordance with the principle of the current invention.

FIG. 7 is a high level block diagram of a plurality of PoE controllers providing redundant powering in accordance with the principle of the current invention. The system of FIG. 7 comprises a first and second PoE controller 200 each comprising a control circuit 210 and at least one PSE 220; at least one redundant powered end station 350 comprising a PD 360 and a first and second data transformer 60; communication cabling 70 comprising a plurality of twisted wire pairs, specifically two twisted wire data pairs 80 and two spare twisted wire pairs 90; and a third and fourth data transformer 60 associated respectively with each twisted wire data pair 80.

Control circuit 210 of each PoE controller 200 is connected to each of the plurality of PSEs 220 contained within each of first and second PoE controller 200. The control circuits 210 are connected together via a communication channel 340. The two outputs of one PSE 220 of first PoE controller 200, respectively representing power and return, are respectively connected to a center tap of the secondary of each of the respective third and fourth data transformers 60 associated with twisted wire data pairs 80. The two outputs of one PSE 220 of second PoE controller 200, respectively representing power and return, are respectively connected to first ends of each of two spare twisted wire pairs 90. The ends of the secondary of each of the respective associated third and fourth data transformers 60 are respectively connected to a first end of each of one of the two twisted wire data pairs 80 of the communication cabling 70. The second end of each of the two twisted wire data pairs 80 are respectively connected to ends of the primary of first and second data transformers 60 of the redundant powered end station 350. The center tap of the primary of each of first and second data transformers 60 of redundant powered end station 350 are connected to a first power input of PD 360, representing power and return. The second end of each of the 2 spare twisted wire pairs 90 are respectively connected to a second power input of PD 360, representing power and return. PD 360 is arranged to receive power from either first power input or second power input. In an exemplary embodiment first power input and second power input of PD 360 are connected via a diode bridge to enable powering through either first or second power input. The first power input of PD 360 is thus operatively connected to receive power from one PSE 220 of first PoE controller 200 via two twisted wire data pairs 80 of data communication cabling 70 and the second power input of PD 360 is thus operatively connected to receive power from one PSE 220 of second PoE controller 200 via two spare twisted wire pairs 90 of data communication cabling 70.

In operation control circuit 210 of first PoE controller 200 operates one PSE 220 to identify, optionally classify, power and monitor the associated power input of PD 360 via twisted wire data pairs 80 of communication cabling 70. Control circuit 210 of first PoE controller 200 is in communication with control circuit 210 of second PoE controller 200 via communication path 340 to coordinate, set appropriate voltages and optionally disable MPS monitoring as will be described further hereinto below. Redundant power is supplied on a standby basis from one PSE 220 of second PoE controller 200 via spare twisted wire pairs 90 of communication cabling 70.

Communication cabling 70 is shown comprising twisted wire data pairs 80 and spare wire pairs 90 however this is not meant to be limiting in any way. In one embodiment, such as a gigabit Ethernet environment, all four twisted wire pairs are utilized for data, and thus spare twisted wire pairs 90 carry data as well. In such an embodiment one PSE 220 of first PoE controller 200 powers PD 360 via a first set of twisted wire data pairs of communication cabling 70, and one PSE 220 of second PoE controller 200 supplies a redundant powering path for PD 360 via a distinct second set of twisted wire data pairs 90 of communication cabling 70.

Control circuit 210 is shown as being a separate module from each PSE 220 and in communication with each PSE 220, however this is not meant to be limiting in any way. In one embodiment certain functions, such as detection, classification and monitoring of each PSE 220 are accomplished via control circuit 210 in cooperation with PSE 220. PSE 220, at a minimum, comprises a controllable switch such as a FET, power MOSFET or bipolar transistor. Preferably a power MOSFET is used so as to enable current limiting.

Figure 8:
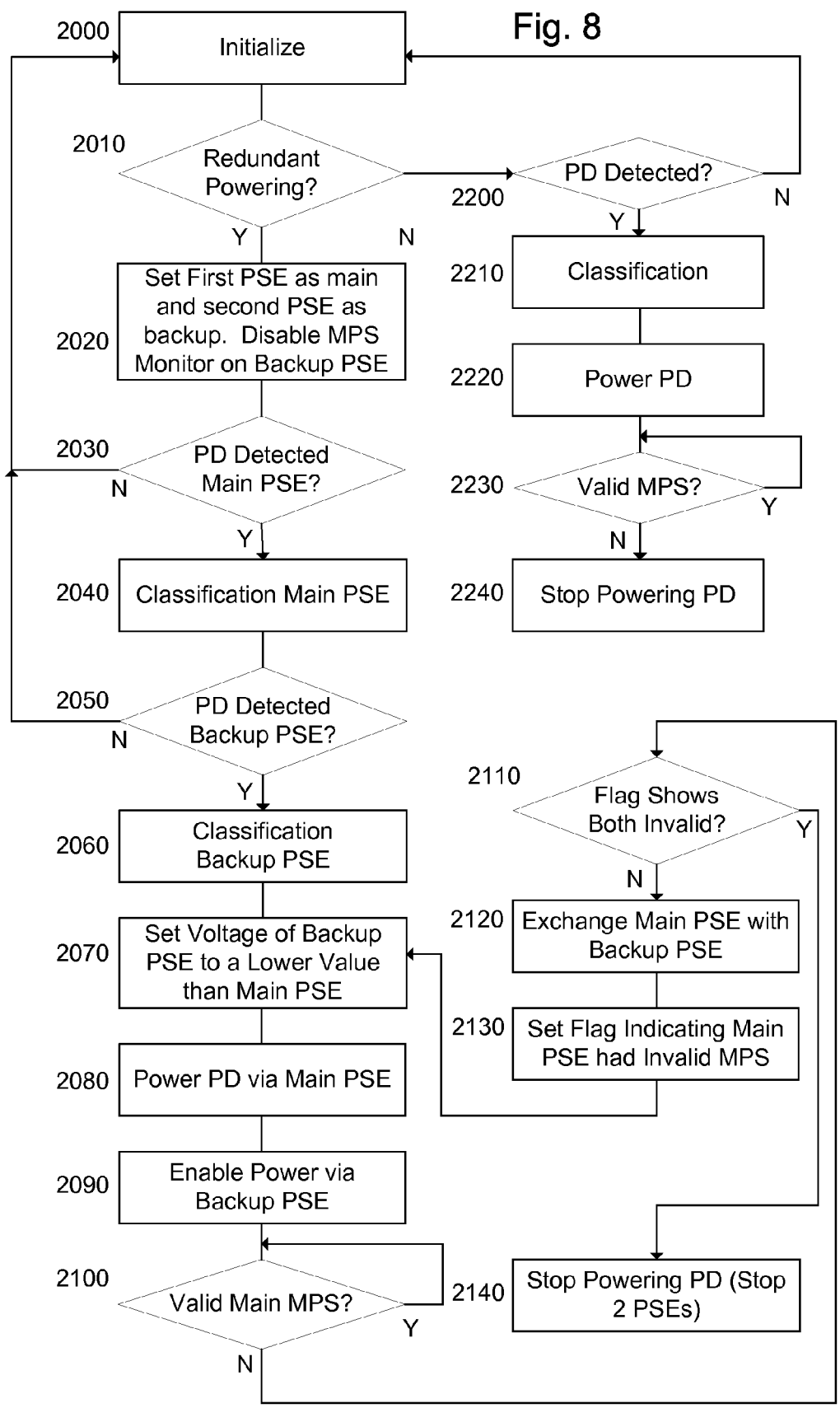
FIG. 8 is a high level flow chart of the operation of the control circuits of FIG. 7 in accordance with the principle of the current invention to provide redundant powering of a PD.

FIG. 8 is a high level flow chart of the operation of the control circuits of FIG. 7 in accordance with the principle of the current invention to provide redundant powering of a PD. In stage 2000 the system is initialized, including inputting from a host computer (not shown) or from another source each PSE 220 that is to operate as a backup for another PSE 220, denoted herein as main PSE 220 and backup PSE 220 respectively. Preferably the backup PSE 220 is part of a different PoE controller 200.

In stage 2010 the mode of operation input in stage 2000 is checked to see if the current PSE 220 is part of a redundant powering operation. In the event that in stage 2010 it is determined that PSE 220 is associated with a redundant powering operation, in stage 2020 a first PSE 220 is designated as a main PSE 220 and a second PSE 220 is designated as a backup PSE 220. MPS monitoring functionality 440 of backup PSE 220 is preferably disabled. In stage 2030 detection by main PSE 220 is enabled, preferably by the operation of detection functionality 420 of main PSE 220. In the event that in stage 2030 a PD is detected, in stage 2040 classification by main PSE 220 is enabled preferably via classification functionality 430 of main PSE 220. It is to be understood that classification stage 2040 is optional. In stage 2050 detection by backup PSE 220 is enabled, preferably by the operation of detection functionality 420. In the event that in stage 2050 a PD is detected, in stage 2060 classification by backup PSE 220 is enabled preferably via classification functionality 430 of backup PSE 220. It is to be understood that classification stage 2060 is optional.

In stage 2070 the voltage output of backup PSE 220 is set to a lower value than the voltage output of main PSE 220. Setting backup PSE 220 to a lower value ensures that power for PD 360 will be drawn from main PSE 220 and will only be drawn from backup PSE 220 in the event of a failure of main PSE 220. In stage 2080 main PSE 220 is enabled, preferably via switch functionality 450, thereby supplying power to PD 360 in accordance with the voltage setting of stage 2070. In stage 2090 backup PSE 220 is enabled, preferably via switch functionality 450, thereby enabling backup powering from backup PSE 220 in the event of a failure of main PSE 220. Backup PSE 220 is enabled in accordance with the voltage setting of stage 2070. In stage 2100 MPS monitoring functionality of main PSE 220 is monitored. In the event that a valid MPS is detected stage 2100 is repeated.

In the event that in stage 2100 a valid MPS is not detected, in stage 2110 a flag is inspected to determine if both main and backup PSE 220 have detected an invalid MPS. In the event that both main and backup PSE 220 have detected an invalid MPS in stage 2140 both main PSE 220 and backup PSE 220 are disabled, preferably by operating respective switch functionality 450.

In the event that in stage 2110 both main and backup PSE 220 have not detected an invalid MPS, in stage 2120 the labels associated with main PSE 220 and backup PSE 220 are exchanged. Thus, the first PSE 220, which in stage 2020 had been designated as main PSE 220, is now designated as backup PSE 220, and the second PSE 220, which in stage 2020 had been designates as backup PSE 220, is now designated main PSE 220. In stage 2130 the flag indicating that first PSE 220 as main PSE had detected an invalid MPS is set. Stage 2070 as described above is then repeated.

In the event that either in stages 2030 or 2050 a valid PD detection signature is not detected, stage 2000 is repeated. Thus, in the event that no valid PD is detected the system continues to identify other PDs requiring powering. In a preferred embodiment the return to stage 2000 from stage 2050 includes a flag indicating that redundant PSE 220 has failed to detect a valid signature. In an exemplary embodiment a user is informed, and may reconfigure the PSE for non-redundant operation. In another embodiment control 210 of second PoE controller 200 reconfigures backup PSE 220 for PSE powering of a PD 50.

In the event that in stage 2010 it is determined that PSE 220 is not associated with a redundant power operation, in stage 2200 detection functionality 420 of PSE 220 is enabled to attempt to detect a PD 50. In the event that a PD 50 is detected in stage 2210 classification of the detected PD 50 is enabled. Preferably classification is accomplished via classification functionality 430. It is to be understood that classification in accordance with stage 2210 is optional. In stage 2220, PSE 220 is enabled to power the PD 50 detected in stage 2200, preferably via the operation of switch functionality 450. In stage 2230, MPS monitoring functionality 440 of PSE 220 is monitored. In the event that a valid MPS is detected, stage 2230 is repeated. In the event that in stage 2230 a valid MPS is not detected, in stage 2240 PSE 220 stops powering PD 50, preferably by operating switch functionality 450. In the event that in stage 2200 a PD 50 is not detected, stage 2000 is repeated.

Thus, a single PSE 220 is configured to be a backup PSE as described in relation to FIGS. 7,8; a PSE part of a four pair high powering as described in relation to FIGS. 2, 4 and 6; a PSE part of a two pair high powering as described in relation to FIGS. 3, 4 and 6; or a PSE powering a single PD as described in relation to FIGS. 2-4, and 6.

The above has been described in an embodiment in which the PSE switches are integral within the PoE controller, however this is not meant to be limiting in any way. The invention is equally applicable to electronically controlled switches, such as FETs, which are external to the PoE controller.

The present embodiments thus enable a PoE controller exhibiting switches having a powering limit less than that required for increased power levels over two twisted wire pairs. The PoE controller further comprises a control circuit operable in a plurality of modes, a first of whose modes supports increased power levels over two twisted wire pairs and a second of whose modes supports power over four twisted wire pairs.

In the first mode the control circuit operates two ports as a single PSE. In an exemplary embodiment the power outputs are connected together and the real time activities including: detection, classification, and port status monitoring are activated for only one of the two ports. Thus, the two integrated switches are effectively operated in parallel enabling a doubling of the power output while real time activities are performed as a single unit. Thus, an increased power level over two twisted wire pairs is supported without increasing the power handling capabilities of a single integrated switch.

In the second mode the control circuit operates two ports as separate PSEs. Thus each port performs real time activities including detection and classification. In one embodiment each port further performs port status monitoring. Thus in the second mode PSE powering according to the low power standard associated with IEEE 802.3af-2003 is supported. Furthermore, increased power levels over four twisted wire pairs is supported, with the PD exhibiting the appropriate detection, classification and optionally a maintain power signature to each of the constituent two twisted wire pairs.

Optionally, a third mode is further supplied enabling redundant powering of a single PD. One PSE functions as a main PSE and a second PSE functions as a backup. Each port performs real time activities including detection and classification, however preferably only one port performs port status monitoring. Preferably the voltage level of the main PSE is set to a higher value than voltage level of the backup PSE. Thus, in the event of a failure of the main PSE, power is drawn from the backup PSE.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. A power over Ethernet controller supporting a plurality of powering modes, the power over Ethernet controller comprising:
   a control circuit;
   a pair of power sourcing equipments each responsive to said control circuit, each comprising an associated detection functionality and each selectively operative in a first mode and a second mode,
   said control circuit operative to control each of said pair of power sourcing equipment units in alternately one of said first mode and said second mode,
   said first mode comprising operating said pair of power sourcing equipments as a single power sourcing equipment operative to provide power in parallel to a single powered device over communication cabling, wherein said detection functionality associated with only one of said power sourcing equipments of said pair is activated, and
   said second mode comprising operating each of said power sourcing equipments of said pair independently so as to each be operative to provide power to an associated powered device over communication cabling, wherein said detection functionality associated with each of said power sourcing equipments of said pair is activated.

2. A power over Ethernet controller according to claim 1, wherein each of said power sourcing equipments are selectively operative, responsive to said control circuit, in a third mode, in which a first one of said pair of power sourcing equipments is operated as a main power sourcing equipment and a second one of said pair of power sourcing equipments is operated as a backup power sourcing equipment associated with said main power sourcing equipment.

3. A power over Ethernet controller according to claim 2, wherein:
   each of said pair of power sourcing equipments further comprises an associated maintain power signature monitoring functionality;
   said maintain power signature functionality associated with only said power sourcing equipment operated as said main power sourcing equipment is activated in said third mode; and
   each of said power sourcing equipments is selectively operative in each of said first mode, said second mode and said third mode responsive to said control circuit, and wherein each of said power sourcing equipments is selectively operative in said third mode as one of said main power sourcing equipment and said backup power sourcing equipment.

4. A power over Ethernet controller according to claim 2, wherein said backup power sourcing equipment is set to a lower voltage level than said main power sourcing equipment.

5. A power over Ethernet controller according to claim 1, wherein in said first mode each of said power sourcing equipments of said pair output substantially identical currents.

6. A power over Ethernet controller according to claim 1, wherein in said second mode each of said power sourcing equipments of said pair is operative to identify, via said associated detection functionality, said respective associated powered device.

7. A power over Ethernet controller according to claim 6, wherein in said first mode only one of said power sourcing equipments of said pair is operative to identify the single powered device via said associated detection functionality.

8. A power over Ethernet controller according to claim 1, wherein in said first mode only one of said power sourcing equipments of said pair is operative to identify the single powered device via said associated detection functionality.

9. A power over Ethernet controller according to claim 1, wherein in said first mode the outputs of said pair of power sourcing equipments are connected together, said connected together outputs being connected to a single power receiving input of the single powered device.

10. A power over Ethernet controller according to claim 9, wherein said connected together outputs are connected to the single receiving input of the single powered device via the communication cabling.

11. A method of operating a power over Ethernet controller comprising a plurality of power sourcing equipments in a plurality of modes, the method comprising:
   providing two power sourcing equipments each operative in each of a plurality of modes comprising a first mode and a second mode, each of the provided two power sourcing equipments comprising an associated detection functionality; and
   selectively operating each of said provided two power sourcing equipments in one of said plurality of modes, wherein
   in said first mode of said plurality of modes, said operating comprises operating said two power sourcing equipments as a single power sourcing equipment so as to power a single powered device in parallel from said two power sourcing equipments, wherein said detection functionality associated with only one of said two power sourcing equipments is activated; and
   in said second mode of said plurality of modes, said operating comprises operating each of said two power sourcing equipments independently, wherein said detection functionality associated with each of said two power sourcing equipments is activated.

12. A method according to claim 11, wherein each of said provided power sourcing equipments further comprises an associated maintain power signature functionality, and wherein said method further comprises:
   in a third mode of said plurality of modes, said operating comprises designating a first one of said provided power sourcing equipments as a main power sourcing equipment, wherein said detection functionality and said maintain power signature functionality associated with said designated main power sourcing equipment is activated; and
   designating a second one of said provided two power sourcing equipments as a backup power sourcing equipment associated with said designated main power sourcing equipment, wherein said maintain power signature functionality associated with said designated backup power sourcing equipment is not activated.

13. A method according to claim 12, further comprising in said third mode:
   setting the output voltage of said power sourcing equipment designated as said main power sourcing equipment to a first value; and
   setting the output of said power sourcing equipment designated as a backup power sourcing equipment to a second value,
   said second value being lower than said first value.

14. A method according to claim 11, further comprising:
   in said first mode,
   controlling said provided two power sourcing equipments to exhibit substantially identical output currents.

15. A method according to claim 11, further comprising:
   in said second mode,
   operating each of said two power sourcing equipments to identify a connected powered device via said respective associated detection functionality.

16. A method according to claim 15, further comprising:
   in said first mode,
   operating only one of said provided two power sourcing equipments to identify a connected powered device via said activated associated detection functionality.

17. A method according to claim 11, further comprising:
   in said first mode,
   operating only one of said provided two power sourcing equipments to identify a connected powered device via said activated associated detection functionality.

18. A method according to claim 11, further comprising:
   in said first mode,
   connecting the outputs of said provided two power sourcing equipments together; and
   connecting said connected together outputs to a single power receiving input of the single powered device.

19. A method according to claim 11, further comprising:
   in said second mode, connecting each of said provided two power sourcing equipments to separate power inputs of a single powered device.

20. A method according to claim 19, further comprising combining said separate power inputs into a single combined power.

21. A method according to claim 19, further comprising:
   in said second mode,
   controlling the current of said provided two power sourcing equipment to be within a predetermined range of each other.

22. A power over Ethernet controller supporting a plurality of powering modes, the power over Ethernet controller comprising:
   a control circuit;
   two power sourcing equipments each having associated therewith a detection functionality, each selectively operative in a first mode and a second mode, and each responsive to said control circuit,
   said control circuit operative to control each of said power sourcing equipment units alternately in one of said first mode and said second mode,
   said first mode comprising operating said two power sourcing equipments as a single power sourcing equipment operative to provide power in parallel to a single powered device over communication cabling, wherein only a first one of said two power sourcing equipments is operative to identify, by said associated detection functionality, the single powered device connected thereto, the detection functionality associated with a second one of said two power sourcing equipments not being activated; and said second mode comprising operating each of said two power sourcing equipments independently so as to each be operative to identify, via said respective associated detection functionality, and provide power to an associated powered device over communication cabling.

* * * * *